United States Patent
Bandoh (10) Patent No.: US 9,479,370 B2
(45) Date of Patent: Oct. 25, 2016

(54) RADIO RELAY APPARATUS, RADIO COMMUNICATION METHOD AND PROCESSER FOR CONTROLLING RADIO RELAY APPARATUS

(75) Inventor: Kunihiko Bandoh, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 217 days.

(21) Appl. No.: 14/241,382

(22) PCT Filed: Aug. 24, 2012

(86) PCT No.: PCT/JP2012/005335
§ 371 (c)(1),
(2), (4) Date: Feb. 26, 2014

(87) PCT Pub. No.: WO2013/031164
PCT Pub. Date: Mar. 7, 2013

(65) Prior Publication Data
US 2015/0003300 A1    Jan. 1, 2015

(30) Foreign Application Priority Data

Aug. 26, 2011    (JP) .................................. 2011-185230

(51) Int. Cl.
*H04L 5/14*    (2006.01)
*H04W 16/26*    (2009.01)
(Continued)

(52) U.S. Cl.
CPC .............. *H04L 25/22* (2013.01); *H04B 7/155* (2013.01); *H04B 7/15535* (2013.01); *H04L 5/14* (2013.01); *H04W 16/26* (2013.01); *H04W 52/46* (2013.01)

(58) Field of Classification Search
CPC ... H04B 7/155; H04B 7/15535; H04L 25/22; H04L 5/14; H04W 16/26; H04W 52/46
See application file for complete search history.

(56) References Cited

U.S. PATENT DOCUMENTS

| 2008/0043647 A1* | 2/2008 | Yoshida | H04B 7/15528 370/280 |
| 2009/0209199 A1* | 8/2009 | Suga | H04B 7/155 455/7 |

(Continued)

FOREIGN PATENT DOCUMENTS

| JP | 2000-078065 A | 3/2000 |
| JP | 2008-252513 A | 10/2008 |

(Continued)

OTHER PUBLICATIONS

An Office Action; "Notice of Reasons for Rejection," issued by the Japanese Patent Office on Jun. 17, 2014, which corresponds to Japanese Patent Application No. 2013-531067 and is related to U.S. Appl. No. 14/241,382; with English language concise explanation.

(Continued)

*Primary Examiner* — Andrew Lai
*Assistant Examiner* — M Mostazir Rahman
(74) *Attorney, Agent, or Firm* — Studebaker & Brackett PC (57) ABSTRACT

A radio relay apparatus including: a base-station-side control unit 24 for operating at the inversion timings and, from signals from a plurality of radio base stations received by a base-station-side communication unit 22, extracts reception power of the base-station-side communication unit 22 for a reception signal from a radio base station using a frequency of a terminal-side communication unit 32 uses; and a terminal-side control unit 34 for setting transmission power of the terminal-side communication unit 32, wherein the terminal-side control unit 34, when the terminal-side control unit 34 or the base-station-side control unit 24 detects a predetermined event, obtains the reception power from the base-station-side control unit 24 and sets the transmission power of the terminal-side communication unit 32 based on the reception power, thereby prevents deterioration of a signal due to interference of transmission radio waves during operation at inversion timings are provided.

9 Claims, 9 Drawing Sheets

(51) Int. Cl.
*H04L 25/22* (2006.01)
*H04B 7/155* (2006.01)
*H04W 52/46* (2009.01)

(56) References Cited

U.S. PATENT DOCUMENTS

2009/0247072 A1* 10/2009 Nakamura ......... H04B 7/15557
455/11.1
2011/0038294 A1* 2/2011 Zhou .................... H04B 7/155
370/311
2011/0051690 A1 3/2011 Niki

FOREIGN PATENT DOCUMENTS

| JP | 2009-284222 A | 12/2009 |
| JP | 2010-056711 A | 3/2010 |
| JP | 2010-219918 A | 9/2010 |
| JP | 2010-232890 A | 10/2010 |

OTHER PUBLICATIONS

International Search Report; PCT/JP2012/005335; Nov. 6, 2012.

* cited by examiner

| Reception power Pr[dBm] | Transmission power Pt[dBm] |
|---|---|
| $A \leq Pr$ | V |
| $B \leq Pr < A$ | W |
| $C \leq Pr < B$ | X |
| $D \leq Pr < C$ | Y |
| $Pr < D$ | Z |

RADIO RELAY APPARATUS, RADIO COMMUNICATION METHOD AND PROCESSER FOR CONTROLLING RADIO RELAY APPARATUS

CROSS REFERENCE TO RELATED APPLICATION

This application claims priority to and the benefit of Japanese Patent Application No. 2011-185230 (filed on Aug. 26, 2011), the entire contents of which are incorporated herein by reference.

FIELD

The present invention relates to a radio relay apparatus and a radio communication method, and more specifically, to a radio relay apparatus and a radio communication method of a radio communication system employing TDD (Time Division Duplex) scheme.

BACKGROUND

A radio terminal, in order to communicate with a radio base station, needs to be located within a range (a service area) where radio waves from the radio base station reach. However, a mountainous area and a city with many high-rise buildings have areas where the radio waves scarcely reach due to numerous obstructions. Also, there are many areas where the radio waves from the radio base station installed outdoors may not reach (for example, the inside of a building or underground). Especially, high-speed radio communication schemes such as WiMAX (registered trademark) (WiMAX: Worldwide Interoperability for Microwave Access) standardized based on IEEE standard 802.16e and the like use a frequency band of 2.5 GHz or higher and, since radio waves in such a high frequency band are more likely to travel straight rather than to travel around obstacles, the radio waves are strongly affected by the obstacles. In order to cover such an area where the radio waves may not reach, a radio relay apparatus (repeater) for relaying the radio waves between the radio base station and the radio terminal is needed.

The radio relay device, while having an advantage to allow expansion of the service area, has a disadvantage that the radio waves emitted therefrom causes interference with other radio waves. As an example of interference caused by the radio relay apparatus, there is mutual interference between a donor node in the radio relay apparatus (a base-station-side block) and a service node (a terminal-side block). Here, the donor node is a block for transmitting and receiving data with the radio base station, and the service node is a block for transmitting and receiving the data with the radio terminal.

Figure 8:
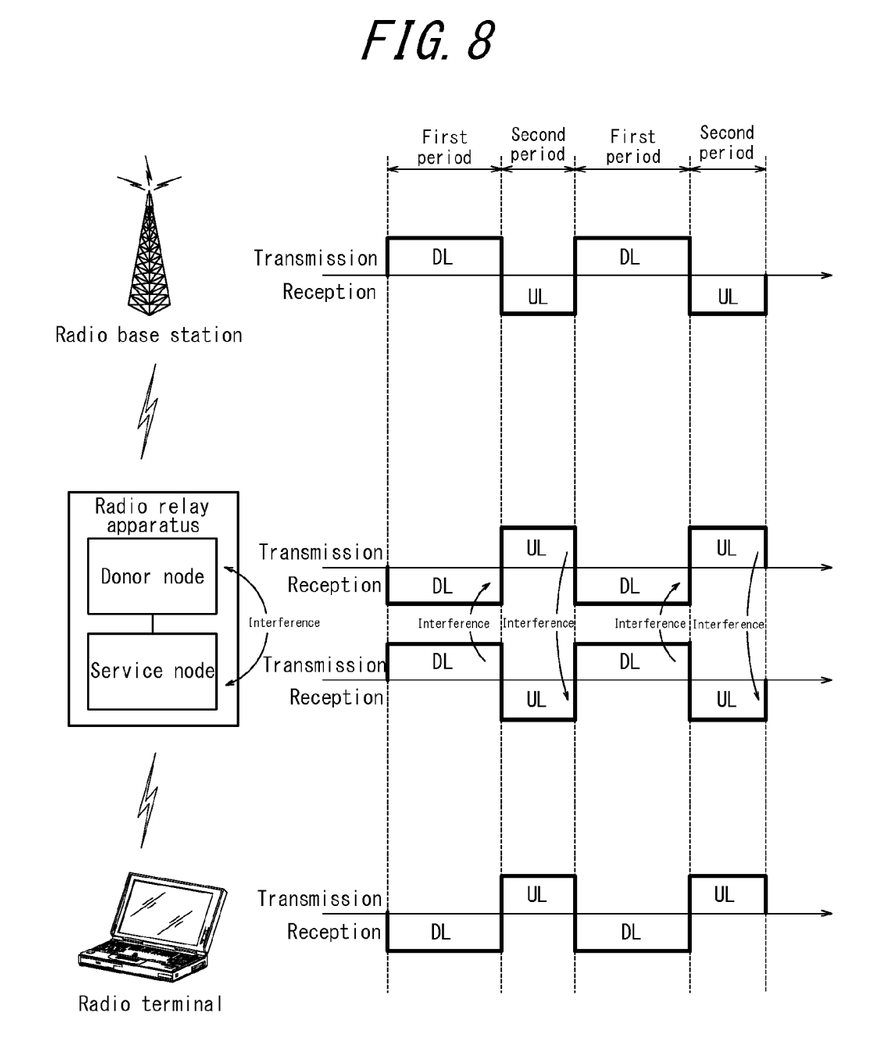
FIG. 8 is a diagram illustrating normal timings of transmission and reception.

FIG. 8 illustrates a state of, in the radio communication system employing the TDD scheme, the mutual interference between the donor node and the service node when the radio relay apparatus operates at normal transmission/reception timings. The TDD scheme is a method of performing fast switchover between transmission and reception by finely dividing time.

At normal transmission/reception timings (hereinafter, referred to as "normal timings"), timings for transmission and reception of the radio base station and those of the service node of the radio relay apparatus are synchronized. That is, in a first period, the radio base station transmits downlink (DL) data to the donor node of the radio relay apparatus, and the service node of the radio relay apparatus transmits the downlink data to the radio terminal. In a second period, also, the radio base station receives uplink (UL) data from the donor node of the radio relay apparatus, and the service node of the radio relay apparatus receives the uplink data from the radio terminal.

When the radio relay apparatus is operating at the normal timings, in the first period the donor node receiving a downlink signal from the radio base station is interfered by a downlink signal transmitted from the service node to the radio terminal. Also, in the second period, the service node receiving an uplink signal from the radio terminal is interfered by an uplink signal transmitted from the donor node to the radio base station.

Figure 9:
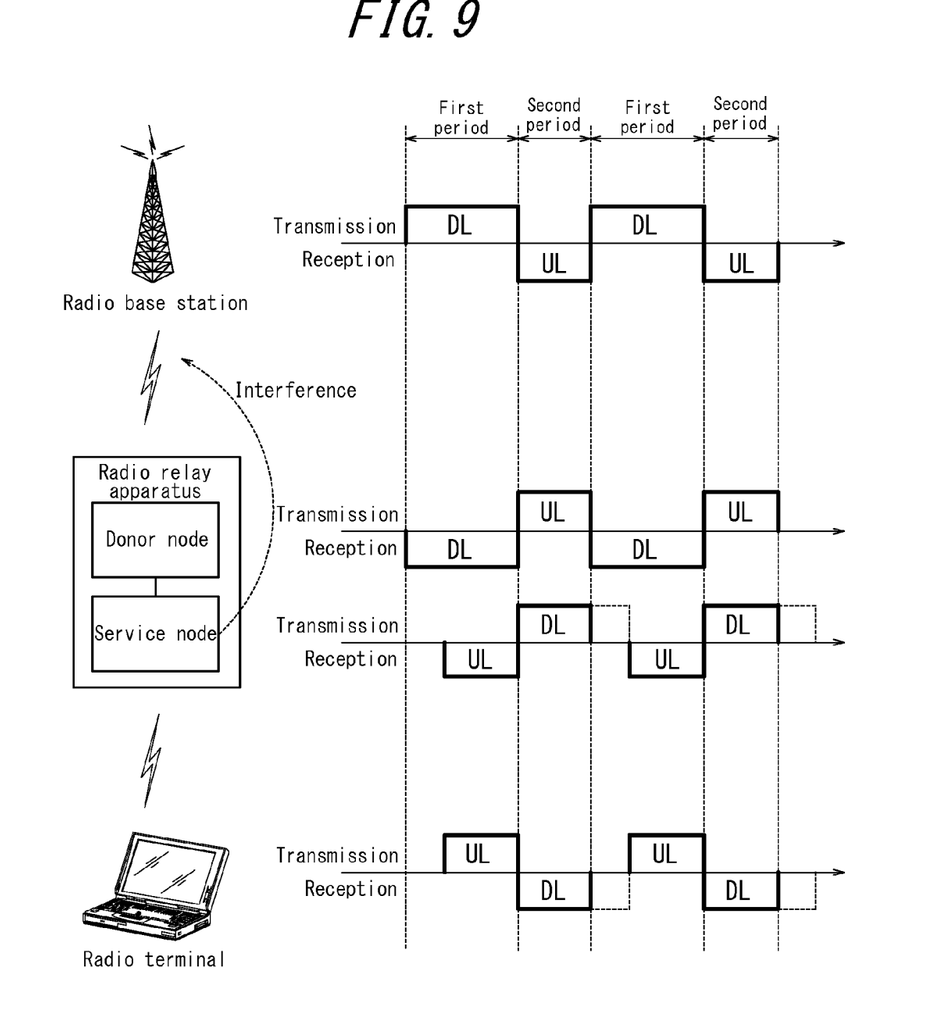
FIG. 9 is a diagram illustrating inversion timings of transmission and reception.

As a method of reducing the mutual interference during operation at the normal timings, there is suggested a method of operating the radio relay apparatus at transmission/reception timings illustrated in FIG. 9 (for example, see Patent Document 1). This method inverts the normal transmission/reception timings of the service node (hereinafter, referred to as "inversion timings").

As described above, by synchronizing transmission and reception of the donor node and the service node of the radio relay apparatus, the mutual interference between the donor node and the service node, which is an issue of the operation at the normal timings, may be eliminated.

PATENT DOCUMENT

Patent Document 1: Japanese Unexamined Patent Application Publication No. 2010-56711

SUMMARY

A radio relay apparatus according to a first aspect of the present invention that, in a radio communication system employing TDD scheme, relays radio waves transmitted and received between a radio base station and a radio terminal, includes:

a base-station-side communication unit configured to transmit radio waves to and receive the radio waves from the radio base station;

a terminal-side communication unit configured to, at transmission and reception timings inverting transmission and reception timings of the radio base station, transmit radio waves to and receive the radio waves from the radio terminal;

a base-station-side control unit configured to, from signals from a plurality of radio base stations received by the base-station-side communication unit, extract reception power of the base-station-side communication unit for a received signal from a radio base station using a frequency the terminal-side communication unit uses; and a terminal-side control unit configured to set transmission power of the terminal-side communication unit, wherein the terminal-side control unit, when the terminal-side control unit or the base-station-side control unit detects a predetermined event, obtains the reception power from the base-station-side control unit and, based on the reception power, sets the transmission power of the terminal-side communication unit.

A second aspect of the present invention is the radio relay apparatus according to the first aspect, wherein the terminal-side control unit holds a setting table and, according to an assignment of the reception power and the transmission power in the setting table, sets the transmission power based on the reception power.

A third aspect of the present invention is the radio relay apparatus according to the second aspect, wherein a parameter of the setting table is adjustable.

A fourth aspect of the present invention is the radio relay apparatus according to any one of the first to third aspects, wherein detection of the predetermined event is detection of initial connection or reconnection between the radio relay apparatus and the radio base station.

A fifth aspect of the present invention is the radio relay apparatus according to any one of the first to third aspects, wherein detection of the predetermined event is detection of restoration from a idle state or detection of handover between the radio relay apparatus and the radio base station.

Although a device has been described above as a solution according to the present invention, methods, programs, and media storing such programs that are equivalent to the above device may also substantialize the present invention and thus are included in the scope of the present invention.

For example, a radio communication method according to a sixth aspect of the present invention as a method substantializing the present invention is, in a radio communication system employing TDD scheme, a radio communication method of a radio relay apparatus which relays data transmitted and received between a radio base station and a radio terminal, wherein the radio relay apparatus including a base-station-side communication unit configured to transmit radio waves to and receive radio waves from the radio base station; and
a terminal-side communication unit configured to transmit radio waves to and receive the radio waves from the radio terminal at transmission and reception timings inverting transmission and reception timings of the radio base station, includes steps of:
   upon detection of a predetermined event,
   extracting, from received signals from a plurality of base stations, reception power of the base-station-side communication unit for a received signal from a radio base station using a frequency the terminal-side communication unit uses; and
   setting, based on extracted reception power, transmission power of the terminal-side communication unit.

A seventh aspect of the present invention is the radio communication method according to the sixth aspect, wherein, at the step of setting, the transmission power is set based on the reception power according to an assignment of the reception power and the transmission power in a setting table.

An eighth aspect of the present invention is the radio communication method according to the seventh aspect, further including a step of adjusting a parameter of the setting table.

A ninth aspect of the present invention is the radio communication method according to any one of the sixth to eighth aspects, wherein detection of the predetermined event is detection of initial connection or reconnection between the radio relay apparatus and the radio base station.

A tenth aspect of the present invention is the radio communication method according to any one of the sixth to eighth aspects, wherein detection of the predetermined event is detection of restoration from a idle state or detection of handover between the radio relay apparatus and the radio base station.

In order to achieve the above object, a processor for controlling a radio relay apparatus according to an eleventh aspect of the present invention is a processor, in a radio communication system employing TDD scheme, for controlling the radio relay apparatus which relays radio waves transmitted and received between a radio base station and a radio terminal, includes:
   a base-station-side communication unit configured to transmit radio waves to and receive the radio waves from the radio base station;
   a terminal-side communication unit configured to transmit radio waves to and receive the radio waves from the radio terminal at transmission and reception timings inverting transmission and reception timings of the radio base station;
   a base-station-side control unit configured to extract, from signals from a plurality of radio base stations received by the base-station-side communication unit, reception power of the base-station-side communication unit for a received signal from a radio base station using a frequency the terminal-side communication unit uses; and
   a terminal-side control unit configured to set transmission power of the terminal-side communication unit, wherein
   the terminal-side control unit, when the terminal-side control unit or the base-station-side control unit detects a predetermined event, obtains the reception power from the base-station-side control unit and, based on the reception power, sets the transmission power of the terminal-side communication unit.

A twelfth aspect of the present invention is the processor according to the eleventh aspect, wherein the terminal-side control unit holds a setting table and, according to an assignment of the reception power and the transmission power in the setting table, sets the transmission power based on the reception power.

A thirteenth aspect of the present invention is the processor according to the twelfth aspect, carries out adjustment of a parameter of the setting table.

A fourteenth aspect of the present invention is the processor according to any one of the eleventh to thirteenth aspects, wherein detection of the predetermined event is detection of initial connection or reconnection between the radio relay apparatus and the radio base station.

A fifteenth aspect of the present invention is the processor according to any one of the eleventh to thirteenth aspects, wherein detection of the predetermined event is detection of restoration from a idle state or detection of handover between the radio relay apparatus and the radio base station.

According to the present invention, a radio relay apparatus for operating at inversion timings and a radio communication method may be provided that are capable of preventing deterioration of a signal to be received by the radio base station due to radio waves transmitted by a service node interfering with the radio base station.

DESCRIPTION OF EMBODIMENT

As described above, by operating a radio relay apparatus at the inversion timings, the mutual interference between a donor node and a service node may be eliminated.

However, when the radio relay apparatus is operated at the inversion timings, interference with another path occurs. As illustrated in FIG. 9, in the second period the radio base station receives the uplink data from the donor node of the radio relay apparatus. In the second period, also, the service node of the radio relay apparatus transmits the downlink data to the radio terminal.

At this time, the radio waves transmitted by the service node reaches the radio terminal establishing a communication and also neighboring radio base stations. Accordingly, a radio base station receiving the uplink signal from the donor node using the frequency which the service node uses (hereinafter, referred to as a "same frequency radio base station") is interfered by the radio waves transmitted by the service node.

The interference with the radio base station by the radio waves transmitted by the service node does not become an issue when the radio waves transmitted by the service node has been sufficiently attenuated before reaching the radio base station, such as when the radio base station and the radio relay apparatus have a sufficient distance therebetween. However, when the radio waves transmitted from the service node reaches the radio base station before sufficiently attenuated, such as when the radio base station and the radio relay apparatus are located close to each other, the interference causes deterioration of a signal to be received by the radio base station.

In a conventional radio relay apparatus, however, the service node has fixed transmission power after activation thereof. Accordingly, when the signal to be received by the radio base station is deteriorated due to the interference in the above path because of an environmental change and the like after the activation, deterioration of the signal to be received is unavoidable.

Accordingly, in consideration of the above problem, the present invention is to provide a radio relay apparatus for operating at the inversion timings and a radio communication method that are capable of preventing deterioration of the signal to be received by the radio base station due to the interference with the radio base station by the radio waves transmitted from the service node.

Hereinafter, one embodiment of the present invention will be described with reference to the accompanying drawings.

Figure 1:
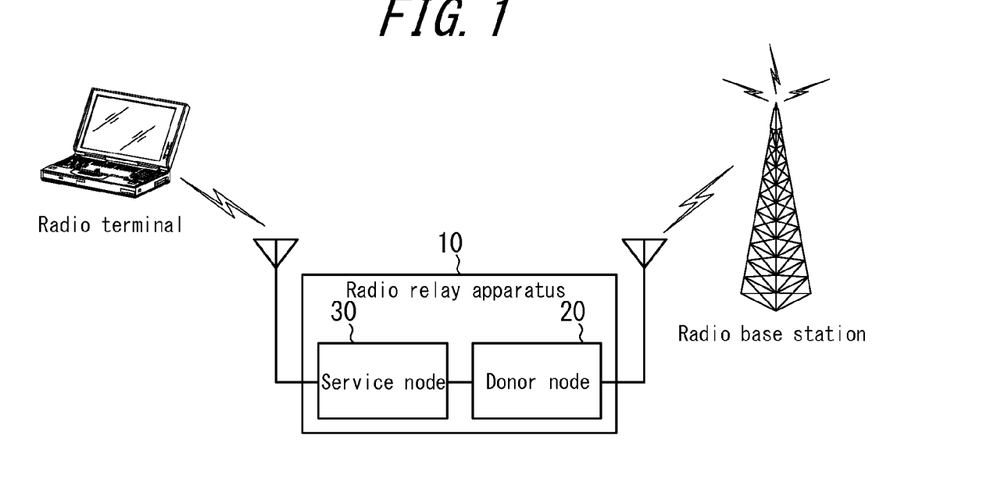
FIG. 1 is a schematic diagram of a radio communication system according to one embodiment of the present invention.

FIG. 1 is a schematic diagram of a radio communication system according to one embodiment of the present invention. The radio communication system includes a radio base station, a radio terminal, and a radio relay apparatus 10. The radio relay apparatus 10 relays data transmitted and received between the radio base station and the radio terminal.

Figure 2:
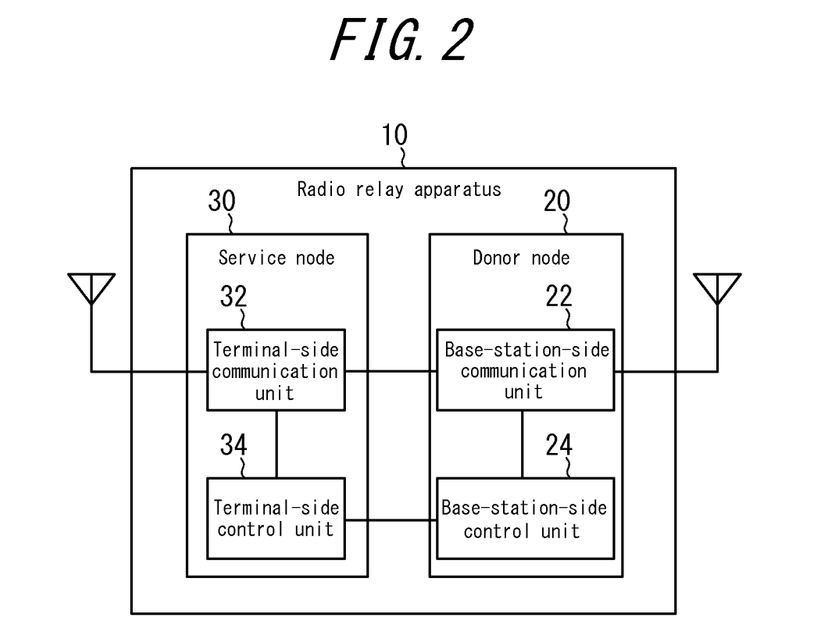
FIG. 2 is a functional block diagram illustrating a schematic configuration of a radio relay apparatus according to one embodiment of the present invention.

FIG. 2 is a functional block diagram illustrating a schematic configuration of the radio relay apparatus according to one embodiment of the present invention. The radio relay apparatus 10 includes a donor node 20 and a service node 30.

First, a functional block of the donor node 20 will be described. The donor node 20 includes a base-station-side communication unit 22 and a base-station-side control unit 24.

The base-station-side communication unit 22 transmits and receives the data with the radio base station via an antenna. As for downlink data, the base-station-side communication unit 22 receives the downlink data from the radio base station as a radio signal in a first period. The base-station-side communication unit 22 down-converts the radio signal into a baseband signal and outputs the baseband signal to a terminal-side communication unit 32. As for uplink data, the base-station-side communication unit 22 receives the uplink data as the baseband signal from the terminal-side communication unit 32. The base-station-side communication unit 22, in a second period, up-converts the baseband signal into the radio signal and transmits the radio signal to the radio base station. The first period and the second period are alternately repeated and, in association therewith, the base-station-side communication unit 22 repeats reception of the downlink data and transmission of the uplink data with the radio base station.

The base-station-side communication unit 22 also receives radio waves from a plurality of neighboring radio base stations. Note that the term "neighboring base stations" is intended to include neighboring radio relay apparatuses, as well. This is because the service node of the radio relay apparatus in operation at the normal timings synchronizes with the timings of transmission and reception of the radio base station and has a similar function.

The base-station-side control unit 24 controls overall donor node 20 including the base-station-side communication unit 22. The base-station-side control unit 24 may be configured by using software executed by any appropriate processor such as a CPU (Central Processing Unit) or a dedicated processor specialized in each processing (for example, DSP (Digital Signal Processor)).

The base-station-side control unit 24, when detecting an event such as initial connection, reconnection, restoration from a idle state, or handover (hereinafter, referred to as a "predetermined event") between the radio relay apparatus 10 and the base station, executes an operation to establish connection between the donor node 20 and the radio base station.

Here, the "initial connection" refers to when power is turned on or reset, and the "reconnection" refers to reconnection after disconnection of a communication between the radio relay apparatus 10 and the radio base station for some reason. Also, the "idle state" refers to a state in which transmission and reception of the data are suspended for saving power, and the term "handover" is used to represent its usual meaning.

The base-station-side control unit 24, when establishing the connection between the donor node 20 and the radio base station, determines a frequency of the donor node 20. The base-station-side control unit 24 notifies the terminal-side control unit 34 of a determined frequency of the donor node 20. Also, the base-station-side control unit 24, from the terminal-side control unit 34, obtains a frequency of the service node 30 determined by the terminal-side control unit 34 based on the frequency of the donor node 20.

The base-station-side control unit 24, based on the obtained frequency of the service node 30, extracts reception power Pr from a same frequency radio base station from signals received by the base-station-side communication unit 22 from a plurality of neighboring radio base stations.

Subsequently, a functional block of the service node 30 will be described. The service node 30 includes a terminal-side communication unit 32 and a terminal-side control unit 34.

The terminal-side communication unit 32 transmits and receives data with the radio terminal via an antenna. The terminal-side communication unit 32, in order to eliminate mutual interference between the donor node 20 and the service node 30, transmits and receives the data with the radio terminal at inversion timings.

The terminal-side communication unit 32 receives the uplink data from the radio terminal in the first period and transmits the downlink data to the radio terminal in the second period. The first period and the second period are alternately repeated and, in association therewith, the terminal-side communication unit 32 repeats reception of the uplink data and transmission of the downlink data with the radio terminal.

As for the downlink data, the terminal-side communication unit 32 receives the downlink data as the baseband signal from the base-station-side communication unit 22, up-converts the baseband signal into the radio signal, and transmits the radio signal to the radio terminal.

As for the uplink data, the terminal-side communication unit 32 receives the uplink data as the radio signal from the radio terminal, down-converts the radio signal into the baseband signal, and transmits the baseband signal to the base-station-side communication unit 22.

The terminal-side control unit 34 controls overall service node 30 including the terminal-side communication unit 32. The terminal-side control unit 34 may be configured by using software executed by any appropriate processor such as the CPU or a dedicated processor specialized in each processing (for example, DSP). Note that, according to the present embodiment, the donor node includes the base-station-side control unit 24 and the service node 30 includes the terminal-side control unit 34, such that the donor node 20 and the service node 30 includes the respective control units. However, the present invention is not limited to such a configuration but, for example, may have a configuration in which both of the donor node 20 and the service node 30 is controlled by a single control unit.

The terminal-side control unit 34, upon detection of the predetermined event, executes an operation to establish connection between the service node 30 and the radio terminal. At this time, the terminal-side control unit 34, based on the frequency of the donor node 20 determined by the base-station-side control unit 24 for the predetermined event, determines the frequency of the service node 30.

The terminal-side control unit 34, upon detection of the predetermined event, obtains the reception power Pr from the same frequency radio base station extracted by the base-station-side control unit 24 and, based on the reception power Pr, sets transmission power Pt of the terminal-side communication unit 32.

For example, when the reception power Pr from the same frequency radio base station is large, the terminal-side control unit 34 determines that the radio relay apparatus 10 and the same frequency radio base station are located close to each other and the signal to be received by the same frequency radio base station may be deteriorated by interference and thus sets the transmission power Pt to be a small value. On the other hand, when the reception power Pr from the same frequency radio base station is small, the terminal-side control unit 34 determines that the radio relay apparatus 10 and the same frequency radio base station are located having long distance therebetween and the signal received to be the same frequency radio base station may not be deteriorated by interference and thus sets the transmission power Pt to be a large value. Note that a setting method of the transmission power Pr based on the reception power Pr may vary according to a communication environment and the like, and the above method is described by way of example.

Figure 3:
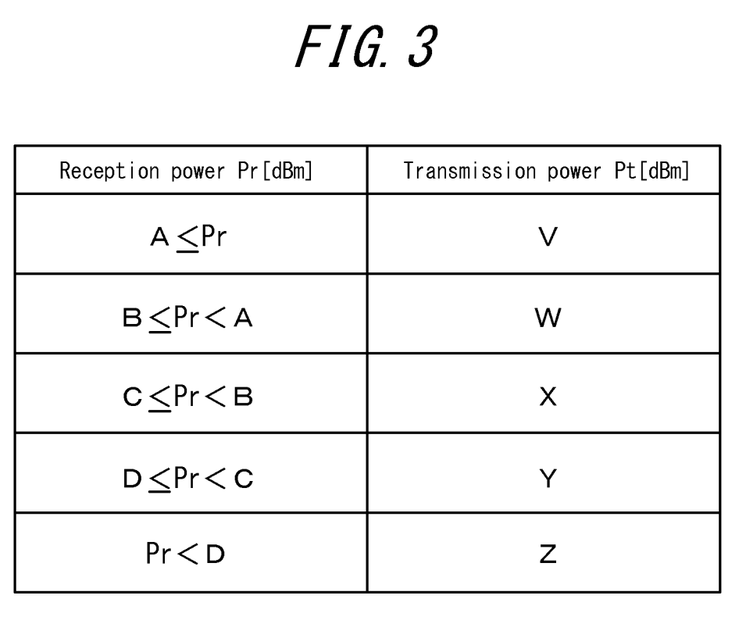
FIG. 3 is a diagram illustrating an example of a setting table of transmission power according to one embodiment of the present invention.

FIG. 3 illustrates an example of the setting table used by the terminal-side control unit 34 to set the transmission power Pt of the terminal-side communication unit 32 based on the reception power Pr from the same frequency radio base station. In the setting table illustrated in FIG. 3, the reception power Pr from the same frequency radio base station is classified into five levels, to each of which a setting value of the transmission power Pt is assigned. For example, when the reception power Pr from the same frequency radio base station is such that $A \leq Pr[dBm]$, the terminal-side control unit 34 sets the transmission power Pt to $V[dBm]$.

Although the terminal-side control unit 34 sets the transmission power Pr of the terminal-side communication unit 32 based on the setting table as illustrated in FIG. 3, parameters such as A-D for determining ranges of the reception power Pr and setting values V-Z of the transmission power Pt may be adjustable. A preliminary adjustment of the parameters to appropriate values may allow appropriate setting of the transmission power Pt.

Figure 4:
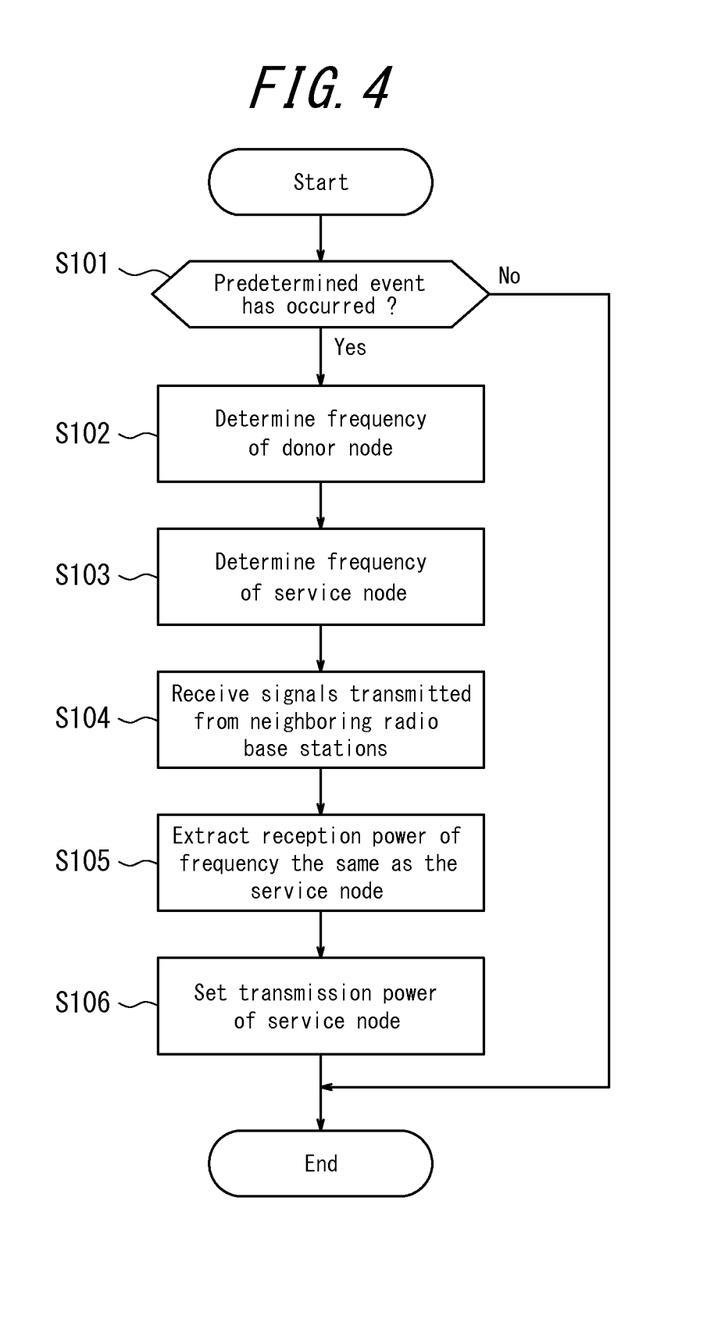
FIG. 4 is a flowchart illustrating an operation to set transmission power of a service node by the radio relay apparatus according to one embodiment of the present invention.

Referring to a flowchart in FIG. 4, an operation by the radio relay apparatus 10 to set the transmission power Pt of the terminal-side communication unit 32 will be described.

The base-station-side control unit 24 and the terminal-side control unit 34 periodically monitor whether the predetermined event has occurred (step S101). Upon detection of the predetermined event, the base-station-side control unit 24 determines the frequency of the donor node 20 and establishes the connection between the donor node 20 and the radio base station (step S102). The terminal-side control unit 34 obtains the frequency of the donor node 20 from the base-station-side control unit 24, determines the frequency of the service node 30, and then establishes the connection between the service node 30 and the radio base station (step S103).

The base-station-side communication unit 22 receives the radio waves from a plurality of neighboring radio base stations (step S104). The base-station-side control unit 24, from the signals received by the base-station-side communication unit 22, extracts the reception power Pr from the same frequency radio base station using the frequency the service node 30 uses (step S105).

The terminal-side control unit 34, from the base-station-side control unit 24, obtains the reception power Pr from the same frequency radio base station and sets the transmission power Pt of the terminal-side communication unit 32 based on the reception power Pr (step S106).

Figure 5:
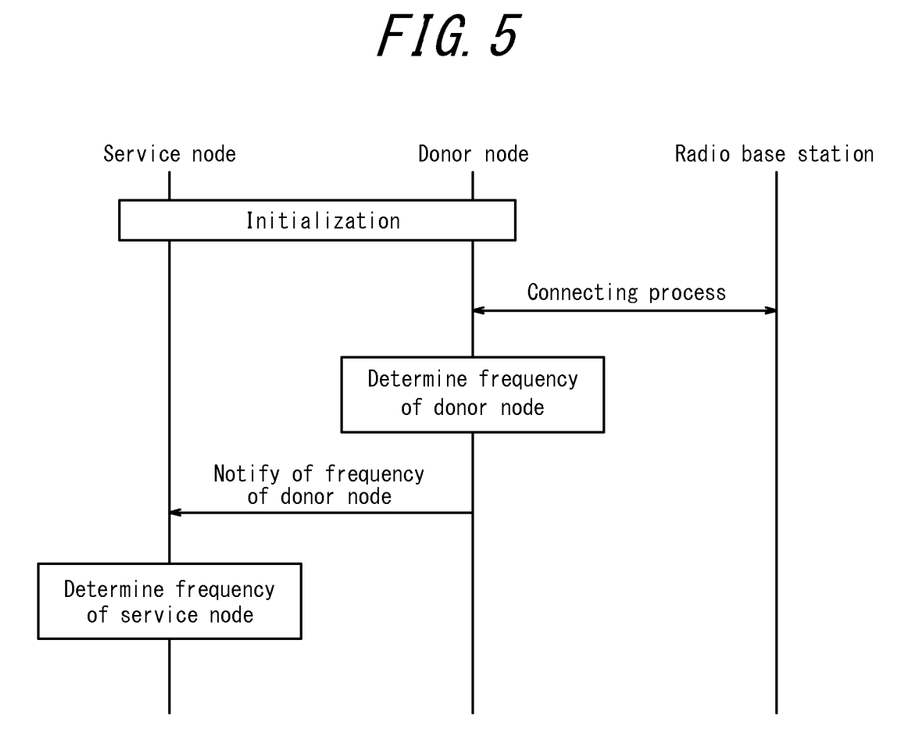
FIG. 5 is a diagram illustrating a sequence for determining a frequency of the service node at the time of initialization by the radio relay apparatus according to one embodiment of the present invention.

FIG. 5 illustrates a sequence for determining the frequency of the service node 30 by the radio relay apparatus 10 at the time of initial connection.

The service node 30 and the donor node 20 are initialized by turning power on or resetting, and the base-station-side control unit 24 of the donor node 20 commences a process to connect with the radio base station and determines the frequency of the donor node 20.

The terminal-side control unit 34 of the service node 30 receives a notification of the frequency of the donor node 20 from the base-station-side control unit 24 and determines the frequency of the service node 30.

Figure 6:
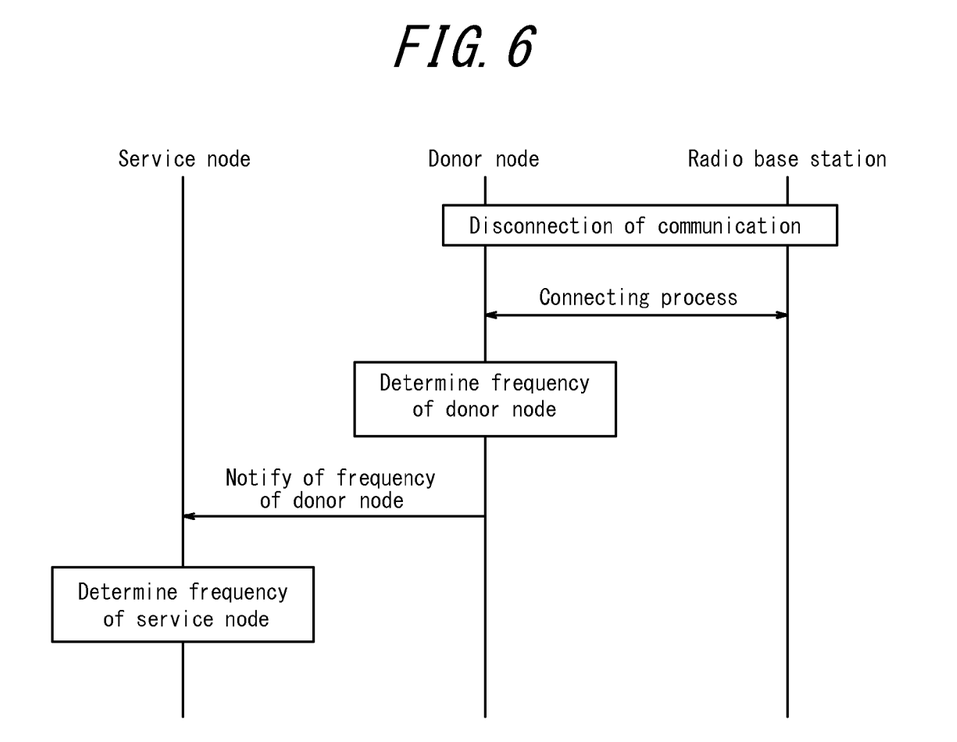
FIG. 6 is a diagram illustrating a sequence for determining a frequency of the service node at the time of reconnection by the radio relay apparatus according to one embodiment of the present invention.

FIG. 6 illustrates a sequence for determining the frequency of the service node 30 by the radio relay apparatus 10 at the time of reconnection.

When the communication between the donor node 20 and the radio base station is disconnected for some reason, the base-station-side control unit 24 of the donor node 20 commences a process to connect with the radio base station and determines the frequency of the donor node 20. A sequence thereafter is similar to that in FIG. 5, and thus a description thereof will be omitted.

Figure 7:
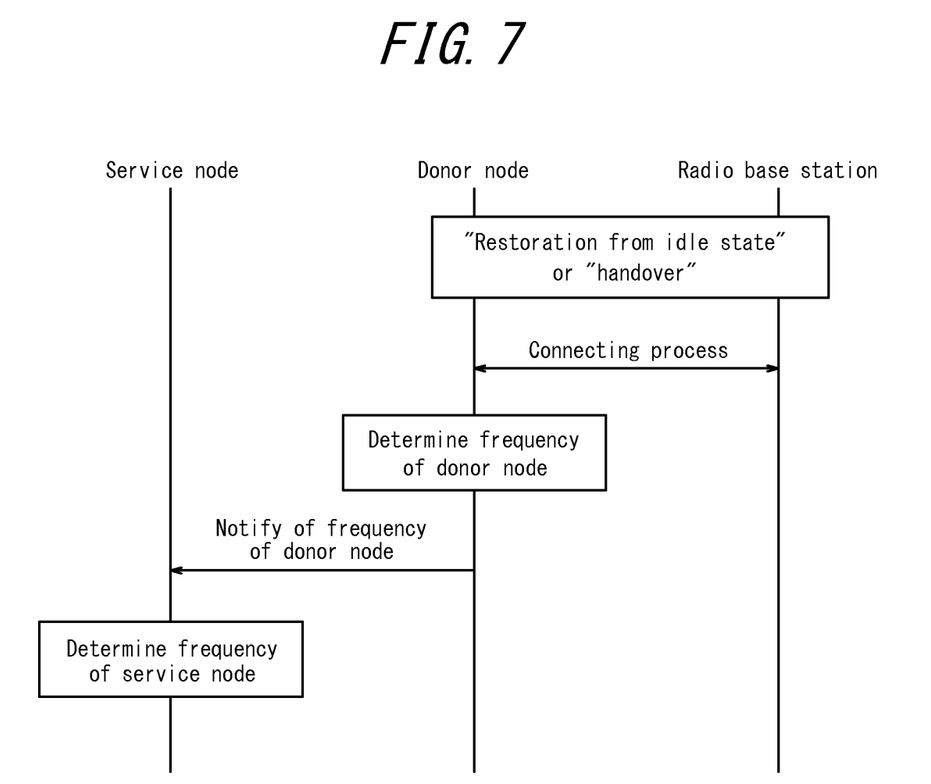
FIG. 7 is a diagram illustrating a sequence for determining a frequency of the service node at the time of restoration from a idle state or at the time of handover by the radio relay apparatus according to one embodiment of the present invention.

FIG. 7 illustrates a sequence for determining the frequency of the service node 30 by the radio relay apparatus 10 at the time of restoration from the idle state or at the time of handover.

When an event such as restoration from the idle state or handover occurs between the donor node 20 and the radio base station, the base-station-side control unit 24 of the donor node 20 commences a process to connect with the radio base station and determines the frequency of the donor node 20. A sequence thereafter is similar to that in FIG. 5, and thus a description thereof will be omitted.

According to the present embodiment, as described above, the radio relay apparatus 10, when the predetermined event occurs, extracts the reception power Pr from the same frequency radio base station and, based on the reception power Pr, sets the transmission power Pt of the terminal-side communication unit 32. Thereby, deterioration of the signal to be received by the same frequency radio base station may be prevented.

Although the present invention has been described based on the figures and the embodiment, it is to be understood that various modifications and changes may be implemented based on the present disclosure by those who are ordinarily skilled in the art. Accordingly, such modifications and changes are included in a scope of the present invention. For example, functions and the like included in each member, means, or step may be rearranged without logical inconsistency, so as to combine a plurality of means or steps together or to divide them.

REFERENCE SIGNS LIST 10 radio relay apparatus
20 donor node
22 base-station-side communication unit
24 base-station-side control unit
30 service node
32 terminal-side communication unit
34 terminal-side control unit

The invention claimed is:

1. A radio relay apparatus, in a radio communication system employing Time Division Duplex (TDD) scheme, for relaying radio waves transmitted and received between a radio base station and a radio terminal, comprising:
a base-station-side communication transceiver configured to transmit radio waves to and receive radio waves from the radio base station;
a terminal-side communication transceiver configured to, at transmission and reception timings inverting transmission and reception timings of the radio base station, transmit radio waves to and receive radio waves from the radio terminal;
a base-station-side controller including a processor configured to, from signals from a plurality of radio base stations received by the base-station-side communication transceiver, extract reception power of the base-station-side communication transceiver for a received signal from a radio base station using a frequency the terminal-side communication transceiver uses; and
a terminal-side controller including a second processor configured to set transmission power of the terminal-side communication transceiver, wherein
the terminal-side controller, when the terminal-side controller or the base-station-side controller detects a predetermined event, obtains the reception power from the base station controller and, based on the reception power, sets the transmission power of the terminal-side transceiver, and wherein
detection of the predetermined event is detection of restoration from an idle state or detection of handover between the radio relay apparatus and the radio base station, and
when the reception power is large, the terminal side controller sets the transmission power to be small, and when the reception power is small, the terminal side controller sets the transmission power to be large.

2. The radio relay apparatus according to claim 1, wherein the terminal-side controller holds a setting table and, according to an assignment of the reception power and the transmission power in the setting table, sets the transmission power based on the reception power.

3. The radio relay apparatus according to claim 2, wherein a parameter of the setting table is adjustable.

4. A radio communication method, in a radio communication system employing Time Division Duplex (TDD) scheme, used by a radio relay apparatus for relaying data transmitted and received between a radio base station and a radio terminal, wherein the radio relay apparatus includes
a base-station-side communication transceiver configured to transmit radio waves to and receive radio waves from the radio base station; and
a terminal-side communication transceiver configured to transmit radio waves to and receive radio waves from the radio terminal at transmission and reception timings inverting transmission and reception timings of the radio base station,
the radio communication method comprising steps of:
upon detection of a predetermined event,
extracting, from received signals from a plurality of base stations, reception power of the base-station-side communication transceiver for a received signal from a radio base station using a frequency the terminal-side communication transceiver uses; and
setting, based on the extracted reception power, transmission power of the terminal-side communication transceiver, wherein detection of the predetermined event is detection of restoration from an idle state or detection of handover between the radio relay apparatus and the radio base station, and when the reception power is large, the transmission power is set to be small, and when the reception power is small, the transmission power is set to be large.

5. The radio communication method according to claim 4, wherein at the step of setting, the transmission power is set based on the reception power according to an assignment of the reception power and the transmission power in a setting table.

6. The radio communication method according to claim 5, further comprising a step of adjusting a parameter of the setting table.

7. A processor, in a radio communication system employing Time Division Duplex (TDD) scheme, for controlling a radio relay apparatus which relays radio waves transmitted and received between a radio base station and a radio terminal, comprising:

a base-station-side communication transceiver configured to transmit radio waves to and receive radio waves from the radio base station;

a terminal-side communication transceiver configured to transmit radio waves to and receive radio waves from the radio terminal at transmission and reception timings inverting transmission and reception timings of the radio base station;

a base-station-side controller including a second processor configured to extract, from signals from a plurality of radio base stations received by the base-station-side communication transceiver, reception power of the base-station-side communication transceiver for a received signal from a radio base station using a frequency the terminal-side communication transceiver uses; and a terminal-side controller including a third processor configured to set transmission power of the terminal-side communication transceiver, wherein the terminal-side controller, when the terminal-side controller or the base-station-side controller detects a predetermined event, obtains the reception power from the base-station-side controller and, based on the reception power, sets the transmission power of the terminal-side communication transceiver, and wherein detection of the predetermined event is detection of restoration from an idle state or detection of handover between the radio relay apparatus and the radio base station, and when the reception power is large, the terminal side controller sets the transmission power to be small, and when the reception power is small, the terminal side controller sets the transmission power to be large.

8. The processor for controlling the radio relay apparatus according to claim 7, wherein the terminal-side controller holds a setting table and, according to an assignment of the reception power and the transmission power in the setting table, sets the transmission power based on the reception power.

9. The processor for controlling the radio relay apparatus according to claim 8, wherein a parameter of the setting table is adjustable.

* * * * *